United States Patent
Kim et al.

(10) Patent No.: US 11,577,778 B2
(45) Date of Patent: Feb. 14, 2023

(54) COUPLING STRUCTURE OF SUSPENSION

(71) Applicants: HYUNDAI MOTOR COMPANY, Seoul (KR); KIA CORPORATION, Seoul (KR)

(72) Inventors: Jae Young Kim, Ulsan (KR); Jae Won Lee, Bucheon-si (KR); Ha Kyung Moon, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 86 days.

(21) Appl. No.: 17/379,502

(22) Filed: Jul. 19, 2021

(65) Prior Publication Data
US 2022/0081031 A1 Mar. 17, 2022

(30) Foreign Application Priority Data
Sep. 16, 2020 (KR) .................. 10-2020-0118956

(51) Int. Cl.
*B60G 15/06* (2006.01)
*B62D 7/18* (2006.01)
*B62D 7/15* (2006.01)

(52) U.S. Cl.
CPC .............. *B62D 7/18* (2013.01); *B60G 15/067* (2013.01); *B62D 7/1545* (2013.01); *B60G 2204/129* (2013.01)

(58) Field of Classification Search
CPC ............ B60G 2206/50; B60G 2500/40; B60G 2204/10; B60G 15/068; B60G 15/067; B62D 7/1545; B62D 7/18
See application file for complete search history.

(56) References Cited

U.S. PATENT DOCUMENTS 10,625,778 B2 * 4/2020 Buchwitz .............. B60B 27/065
10,836,230 B2 * 11/2020 Hintzen ................... B60G 3/06
11,364,761 B2 * 6/2022 Jang ..................... B62D 5/0418
(Continued)

FOREIGN PATENT DOCUMENTS

CN 109484482 A * 3/2019
CN 110667703 A * 1/2020
(Continued)

*Primary Examiner* — Paul N Dickson
*Assistant Examiner* — Maxwell L Meshaka
(74) *Attorney, Agent, or Firm* — Morgan, Lewis & Bockius LLP

(57) ABSTRACT

A coupling structure of suspension may include an assist knuckle, a RevoKnuckle rotatably engaged with the assist knuckle, rotated independently from the assist knuckle, and performing steering of a wheel located at an outermost periphery, a steering input portion fixed to a vehicle body and applying a steering force to the RevoKnuckle during steering, a rotation transfer unit located between and coupled between the RevoKnuckle and the steering input portion and absorbing angular displacement formed between the steering input portion and the RevoKnuckle, a first link unit having one end located on one side surface of the assist knuckle and the other end located at a lower end of the RevoKnuckle, and a second link unit having one end located on the other side surface of the assist knuckle and the other end located adjacent to the other end of the first link unit at the lower end of the RevoKnuckle.

17 Claims, 6 Drawing Sheets

(56) References Cited

U.S. PATENT DOCUMENTS

| | | | |
|---|---|---|---|
| 2003/0107201 A1* | 6/2003 | Chun | B62D 7/18 |
| | | | 280/124.135 |
| 2007/0045036 A1* | 3/2007 | Takeuchi | B62D 5/0418 |
| | | | 280/124.145 |
| 2019/0071120 A1* | 3/2019 | Buchwitz | B60K 17/34 |
| 2019/0135067 A1* | 5/2019 | Hintzen | B60G 13/005 |
| 2020/0070883 A1* | 3/2020 | Du | B62D 7/18 |
| 2021/0008939 A1* | 1/2021 | Schmidt | B62D 7/146 |
| 2021/0170825 A1* | 6/2021 | Jang | B60G 3/00 |
| 2022/0041212 A1* | 2/2022 | Moon | B62D 7/20 |

FOREIGN PATENT DOCUMENTS

| | | | | |
|---|---|---|---|---|
| DE | 102004001727 A1 * | 8/2005 | | B60G 3/01 |
| DE | 102007047793 A1 * | 5/2009 | | B62D 7/18 |
| DE | 102019106839 A1 * | 9/2020 | | |
| EP | 2147809 A1 * | 1/2010 | | B60G 3/20 |
| KR | 10-2007-0103191 A | 10/2007 | | |

\* cited by examiner

< LEFT-SIDE TURNING AT ANGLE OF 90° >

< RIGHT-SIDE TURNING AT ANGLE OF 60° >

COUPLING STRUCTURE OF SUSPENSION

CROSS-REFERENCE TO RELATED APPLICATION

The present application claims priority to Korean Patent Application No. 10-2020-0118956 filed on Sep. 16, 2020, the entire contents of which is incorporated herein for all purposes by this reference.

BACKGROUND OF THE INVENTION

Field of the Invention

The present invention relates to a coupling structure of a suspension. More particularly, it relates to a coupling structure of a suspension, which provides a RevoKnuckle and a lower arm of a suspension, a steering input portion, and a rotation transfer unit configured to allow a steering driving force applied from the steering input portion to the RevoKnuckle and includes the rotation transfer unit capable of absorbing displacement generated according to a wheel rebound.

Description of Related Art

A suspension for buffering vibration generated between a vehicle wheel and a road surface is provided in a portion of a vehicle in which the vehicle wheel is provided.

The suspension includes various types of suspensions, and a suspension suitable for a type of each vehicle is selected and applied.

For example, as shown in FIG. 1, there is a McPherson suspension. The McPherson suspension includes a knuckle 11, a shock absorber 12 provided in an upper portion of the knuckle 11 to absorb vibration, a lower arm 13 connected to a lower portion of the knuckle 11, and a stabilizer 14 connected to the lower portion of the knuckle 11 or a lower portion of the shock absorber 12.

The knuckle 11 includes a wheel mount portion in which a wheel W is provided in a center portion thereof, a shock absorber connector connected to the shock absorber 12 in the upper portion of the knuckle 11, and a lower arm connector connected to the lower arm 13 in the lower portion of the knuckle 11.

FIG. 2 illustrates a suspension having a structure in which a steering input portion 20 is in an upper end of an assist knuckle 30. A kingpin axis, which extends one end at which the steering input portion 20 and a RevoKnuckle are engaged, is configured at a position spaced a considerable distance from a central axis of a wheel.

According to the above related art, since the steering input portion 20 is located in each suspension, there occurs a problem in that the kingpin axis formed from the steering input portion 20 is located farther away from an inner side of a tire (an excessive kingpin offset).

Furthermore, owing to the above configuration of the kingpin axis, there is a problem in that an excessive load is generated to the steering input portion 20 due to an external force generated according to a road condition, and a size and capacity of the steering input portion 20 is increased to provide a reaction force to prevent the excessive load.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

T Various aspects of the present invention are directed to providing a coupling structure in which a RevoKnuckle engaged with a steering input portion is configured to be movable by as much as a predetermined angle.

In another aspect, various aspects of the present invention provide a coupling structure of a suspension in which a kingpin axis formed from a central axis at which the RevoKnuckle is engaged with a rotation transfer unit is formed at a position adjacent to a central axis of a wheel.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

A coupling structure of a suspension for achieving the objectives of the present invention includes the following configuration.

In various exemplary embodiments of the present invention, there is provided a coupling structure of a suspension, which includes an assist knuckle in which a strut part is located, a RevoKnuckle rotatably engaged with the assist knuckle, rotated independently from the assist knuckle, and configured to perform steering of a wheel which is located at an outermost periphery, a steering input portion fixed to a vehicle body and configured to apply a steering force to the RevoKnuckle during steering, a rotation transfer unit located between and coupled between the RevoKnuckle and the steering input portion and configured to absorb angular displacement formed between the steering input portion and the RevoKnuckle, a first link unit having one end portion mounted on a first side surface of the assist knuckle and another end portion mounted at a lower end portion of the RevoKnuckle, and a second link unit having one end portion mounted on a second side surface of the assist knuckle and another end portion mounted adjacent to another end portion of the first link unit at the lower end portion of the RevoKnuckle.

Furthermore, the rotation transfer unit may be configured such that one end portion of the RevoKnuckle is rotated at a predetermined angle based on a central rotation shaft of the steering input portion.

Furthermore, the rotation transfer unit may include an engagement portion engaged with the steering input portion, and a transfer portion engaged with the RevoKnuckle and coupled to the engagement portion to have a predetermined angle based on the engagement portion.

Furthermore, a kingpin axis facing an extension line of the first link unit, an extension line of the second link unit, and an engagement line on which the steering input portion is engaged with the RevoKnuckle may be configured to be located adjacent to a tire engaged with the RevoKnuckle.

Furthermore, the kingpin axis may be configured to be located to be spaced a distance ranging from 0 mm to 30 mm from a center portion of the wheel in a width direction of the vehicle.

Furthermore, the first link unit may include a first fixing link engaged with the assist knuckle, a first rotating link engaged with the RevoKnuckle, and a first connecting link coupled to the first fixing link and the first rotating link.

Furthermore, the second link unit may include a second fixing link engaged with the assist knuckle, a second rotating link engaged with the RevoKnuckle, and a second connecting link coupled to the second fixing link and the second rotating link.

Furthermore, one end portion of the first fixing link engaged with the RevoKnuckle may be configured at a position relatively closer to an external side of a vehicle than one end portion of the second fixing link.

Furthermore, both end portions of the first connecting link may be configured as ball joints, and the ball joints may be configured to be engaged with the first fixing link and the first rotating link, respectively.

Furthermore, both end portions of the second connecting link may be configured as ball joints, and the ball joints may be configured to be engaged with the second fixing link and the second rotating link, respectively.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
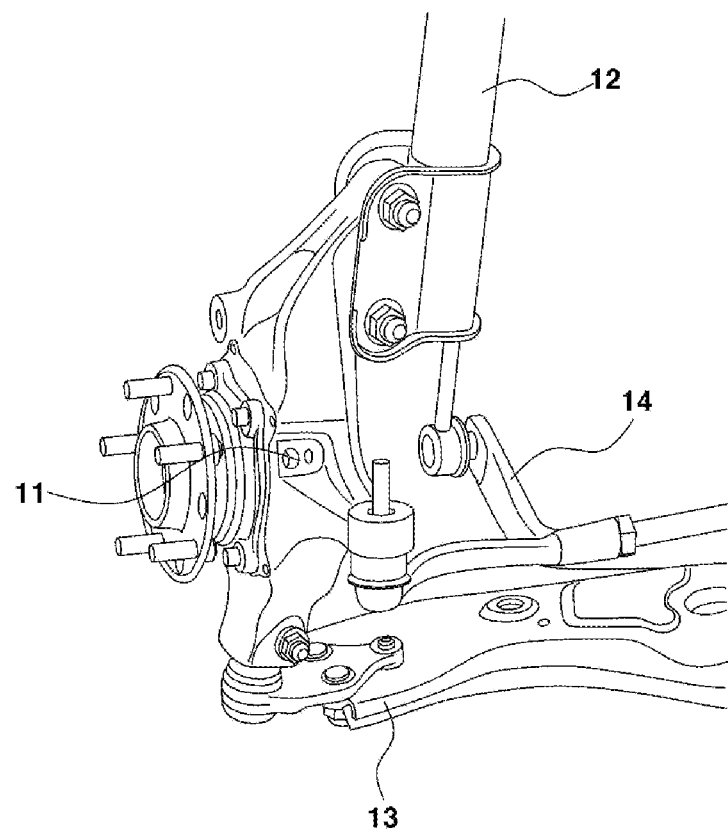
FIG. 1 is diagram illustrating a coupling relationship of a RevoKnuckle according to the related art.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings. The exemplary embodiments of the present invention may be modified in various forms, and the scope of the present invention may not be construed as being limited to the following embodiments. These embodiments are provided to more fully describe the present invention to those skilled in the art.

Furthermore, the term "~ knuckle," "~ unit," "~ portion," or the like used herein means a unit of processing at least one function or operation, and the present unit may be implemented by hardware or a combination of hardware.

Furthermore, in the exemplary embodiment, the terms a first, a second, and the like are assigned to components to discriminate these components because names of the components are the same, but these terms are not necessarily limited to the order in the following description.

Furthermore, in the exemplary embodiment, the term "wheel rebound" may be used as a meaning which includes all states in which a change of a wheel center portion occurs due to application of an external force or the like.

Furthermore, a coupling structure of a suspension of the present invention refers to one suspension engaged with each wheel 900, and in the case of a vehicle having a plurality of wheels, a coupling structure of a suspension configured for being independently steered may be provided at each wheel.

Hereinafter, embodiments will be described in detail with reference to the accompanying drawings, and in describing with reference to the accompanying drawings, the same or corresponding components are assigned the same reference numerals, and duplicate descriptions thereof will be omitted therein.

The present invention relates to a coupling structure of a suspension in which a RevoKnuckle 100 is located in an assist knuckle 200 and configured to be independently rotated with respect to the assist knuckle 200.

Furthermore, the coupling structure of a suspension according to various exemplary embodiments of the present invention includes a structure configured for being independently steered by being engaged with each wheel 900.

Figure 3:
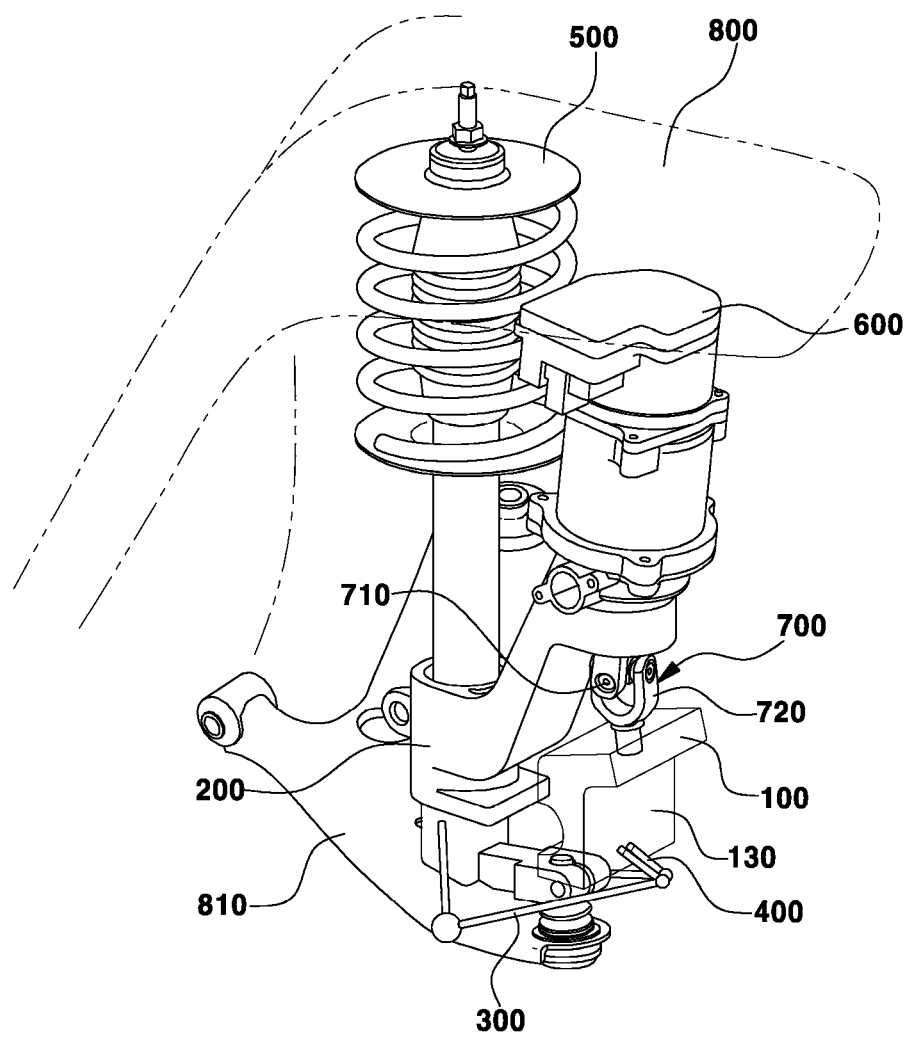
FIG. 3 is a perspective view exemplarily illustrating a coupling structure of a suspension according to various exemplary embodiments of the present invention.

FIG. 3 is a perspective view exemplarily illustrating a coupling structure of a suspension according to various exemplary embodiments of the present invention.

The present invention includes a lower arm 810 engaged with a vehicle body 800 or a frame and located in a width direction of a vehicle, a strut part 500 engaged with an upper end portion of the vehicle body 800, and the assist knuckle 200 configured to be located at a lower end portion of the strut part 500. A lower end portion of the assist knuckle 200 is fixed by the lower arm 810 engaged with the vehicle body 800, and the strut part 500 located at an upper end portion of the assist knuckle 200 is used as a concept including a shock absorber.

Since the RevoKnuckle 100 is located in a recessed space of the assist knuckle 200 and end portions of the RevoKnuckle 100 are engaged with internal sides of two extending end portions of the assist knuckle 200, one surface of the RevoKnuckle 100 includes a wheel mount portion 130 in which the wheel 900 is fixed.

In various exemplary embodiments of the present invention, the RevoKnuckle 100 includes an upper end portion which is engaged with an upper hole of the assist knuckle 200, and a lower end portion which is engaged with a first link unit 300 and a second link unit 400. The RevoKnuckle 100 is rotated about a central axis of the upper end portion and the lower end portion. The RevoKnuckle 100 is configured to be rotated through a rotation transfer unit 700 passing through the upper hole of the assist knuckle 200 to be engaged with a steering input portion 600.

The first link unit 300 includes a first fixing link 310 engaged with one side surface of the assist knuckle 200 and a first rotating link 330 engaged with one surface of the RevoKnuckle 100 and includes a first connecting link 320 located between the first fixing link 310 and the first rotating link 330.

Furthermore, the second link unit 400 includes a second fixing link 410 engaged with to the other side surface of the assist knuckle 200 and a second rotating link 430 located adjacent to the first rotating link 330 engaged with the one surface of the RevoKnuckle 100 and includes a second connecting link 420 located between the second fixing link 410 and the second rotating link 430.

Thus, the first rotating link 330 and the second rotating link 430 may be engaged to allow the RevoKnuckle 100 to be rotated at an angle of 90 degrees at maximum in both directions in a response to an input of the steering input portion 600. The first rotating link 330 and the second rotating link 430 may guide the RevoKnuckle 100 to be rotated at an angle of 90 degrees in one direction and at an angle of 60 degrees in the other direction thereof.

The first fixing link 310 and the second fixing link 410 are configured to extend downward in a height direction of the assist knuckle 200. The first fixing link 310 and the second fixing link 410 are located to correspond to the two side surfaces of the assist knuckle 200, and when compared with the second fixing link 410, the first fixing link 310 includes an inclined shape to allow one end portion of the first fixing link 310 to be located in a direction close to the wheel 900 of the vehicle. With the above configuration, when the RevoKnuckle 100 is rotated, the first rotating link 330 engaged with the first fixing link 310 and the second rotating link 430 engaged with the second fixing link 410 are located to prevent interference during rotational movement.

However, in another exemplary embodiment of the present invention, at least one of the first fixing link 310 and the second fixing link 410 may be configured to be inclined so that, when the RevoKnuckle 100 is rotated, avoidance of driving interference of the first link unit 300 and the second link unit 400 may be performed. Furthermore, in various exemplary embodiments of the present invention, one end portion of the first fixing link 310 engaged with the RevoKnuckle 100 via the first rotating link (330) may be configured at a position closer to an external side of the vehicle than one end portion of the second fixing link 410.

Furthermore, the present invention includes the steering input portion 600 which is configured to be fixed to the vehicle body 800 and to be engaged with the RevoKnuckle 100 to allow a steering force to be applied in a response to a steering input of a user. In various exemplary embodiments of the present invention, the steering input portion 600 may be formed of a steering motor configured to receive an electronic signal to change a steering angle of the RevoKnuckle 100. The steering input portion 600 is configured such that a rotation shaft thereof is inserted into the upper end portion of the assist knuckle 200 and a rotational force is applied to the RevoKnuckle 100 through the rotation transfer unit 700 engaged with the rotation shaft. One end portion of the steering input portion 600 may be fixed to and located at the vehicle body 800 or may be located in a form of being fixed to the assist knuckle 200.

In various exemplary embodiments of the present invention, it is configured such that the strut part 500 is engaged with a lower end portion of the assist knuckle 200, and a rotating force of the steering input portion 600 is applied to the RevoKnuckle 100 through the rotation transfer unit 700 located between the upper hole of the assist knuckle 200 and the steering input portion 600.

The first link unit 300 is located on the one side surface of the assist knuckle 200, and one end portion of the first link unit 300 is configured to be located on one surface of a lower end portion of the RevoKnuckle 100. The second link unit 400 is located on the other side surface of the assist knuckle 200, and one end portion of the second link unit 400 is configured to be engaged at a position adjacent to the one end portion of the first link unit 300 in the lower end portion of the RevoKnuckle 100.

Furthermore, both end portions of the first connecting link 320 of the first link unit 300 and both end portions of the second connecting link 420 of the second link unit 400 are configured to be engaged with each other through ball joints. Thus, as the RevoKnuckle 100 is rotated due to the steering input portion 600, the first rotating link 330 and the second rotating link 430 are configured to be interlocked with each other to be moved.

The first connecting link 320 may be moved in a response to a rotation of the RevoKnuckle 100 to be interlocked with the first rotating link 330, and the second connecting link 420 may correspond to the rotation of the RevoKnuckle 100 to be interlocked with the second rotating link 430.

That is, it is configured such that the one end portions of the first fixing link 310 and the second fixing link 410, which are engaged with the two side surfaces of the assist knuckle 200, are fixed, and the one end portions of the first rotating link 330 and the second rotating link 430, which are engaged with the RevoKnuckle 100, are fixed. Thus, the first link unit 300 and the second link unit 400 are configured to be moved in a response to a rotation angle of the RevoKnuckle 100 through the ball joints located at both the end portions of the first connecting link 320 and both the end portions of the second connecting link 420.

The first rotating link 330 of the first link unit 300 and the second rotating link 430 of the second link unit 400 are configured at positions adjacent to each other. Furthermore, in various exemplary embodiments of the present invention, the one end portions of the first rotating link 330 and the second rotating link 430 may be located at positions on the RevoKnuckle 100, which are spaced the same distance from a center portion based on one surface adjacent to the wheel 900.

When a rotating force of the steering input portion 600 is applied to the RevoKnuckle 100, the RevoKnuckle 100 is rotated based on a rotation axis of the rotation transfer unit 700, and each of the first rotating link 330 and the second rotating link 430 is interlocked with the RevoKnuckle 100 to be rotated to have a predetermined angle. When the RevoKnuckle 100 is rotated, the first rotating link 330 is configured to be rotated based on the ball joint located at the one end portion of the first connecting link 320, and the second rotating link 430 is configured to be rotated through the ball joint located at the one end portion of the second connecting link 420 so that the first rotating link 330 and the second rotating link 430 may be moved by being interlocked with the RevoKnuckle 100.

One end portion of the rotation transfer unit 700 is configured to be engaged with a rotation shaft of the steering input portion 600 inserted into the assist knuckle 200, and the other end portion of the rotation transfer unit 700 is configured to be engaged with the upper end portion of the RevoKnuckle 100. The rotation transfer unit 700 may be configured to transmit a rotating force applied from the steering input portion 600 to the RevoKnuckle 100, and simultaneously, allow the rotation shaft of the steering input portion 600 to have a predetermined angle with respect to a rotation shaft of the RevoKnuckle 100. In various exemplary embodiments of the present invention, the rotation transfer unit 700 may be formed of a universal joint and may be configured in a form of being inclined based on the height direction to allow the rotation shaft of the steering input portion 600 and the rotation shaft of the RevoKnuckle 100 to be configured at different positions. The rotation transfer unit 700 may include an engagement portion 710 engaged with the rotation shaft of the steering input portion 600 and a transfer portion 720 in a form of being inclined at a predetermined angle based on the engagement portion 710. Thus, the transfer portion 720 is configured to transfer a rotating force applied from the engagement portion 710 to the RevoKnuckle 100.

Figure 4:
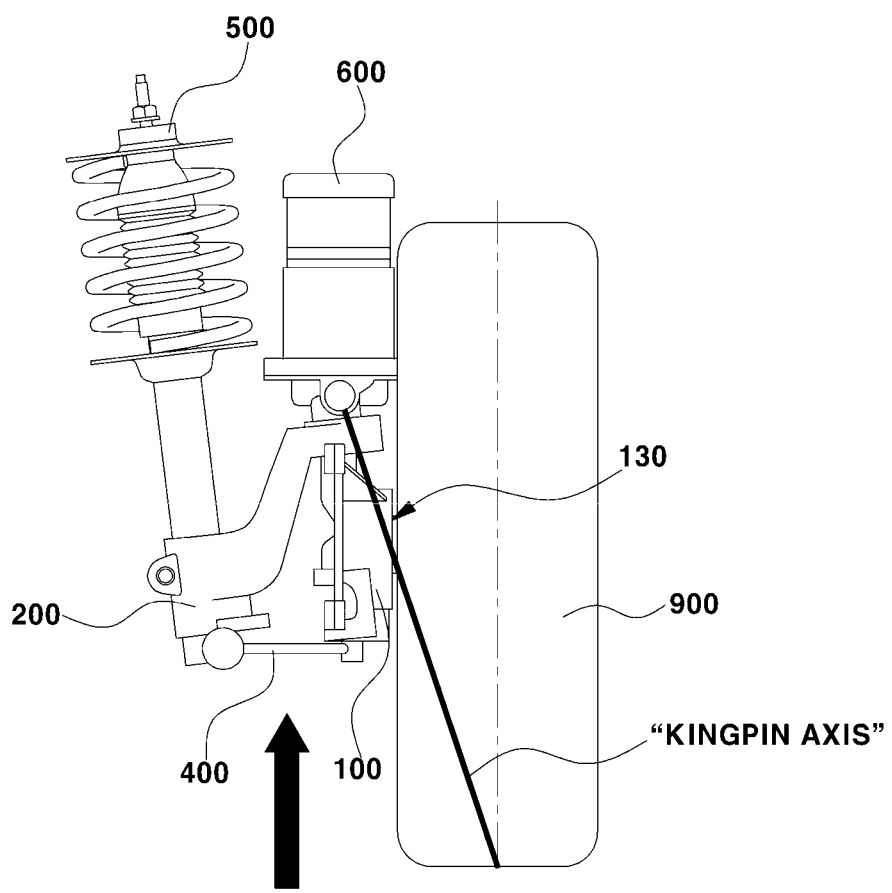
FIG. 4 is a diagram illustrating a position of a kingpin axis of the coupling structure of a suspension according to various exemplary embodiments of the present invention.

FIG. 4 is a diagram illustrating a configuration of a kingpin axis formed through an engagement relationship between the RevoKnuckle 100 and the steering input portion 600 through the rotation transfer unit 700 according to various exemplary embodiments of the present invention.

As shown in the drawing, the rotation shaft of the steering input portion 600 and the rotation shaft of the RevoKnuckle 100 are configured to be inclined by as much as a predetermined angle. Thus, the inclination angle is determined by an angle between the engagement portion 710 and the transfer portion 720 of the rotation transfer unit 700.

In various exemplary embodiments of the present invention, the kingpin axis is formed by an angle between the transfer portion 720 and the rotation shaft of the steering input portion 600. Thus, the kingpin axis is configured to be located at a position adjacent to a central axis in a width direction of the wheel 900. The kingpin axis facing an extension line of the first link unit 300, an extension line of the second link unit 400, and an engagement line on which the steering input portion 600 is engaged with the RevoKnuckle 100 is located adjacent to a tire engaged with the RevoKnuckle 100.

Figure 2:
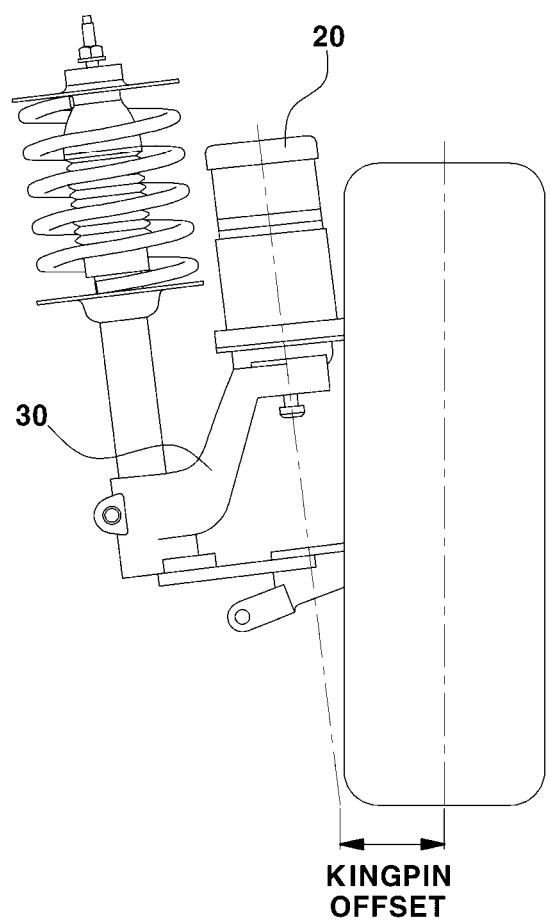
FIG. 2 is a diagram illustrating a kingpin axis of the suspension in which a steering input portion is directly engaged with an assist knuckle according to the related art.

In comparison, to describe a kingpin axis of the coupling structure of a suspension disclosed in FIG. 2 according to the related art, the kingpin axis is formed at a position extending from the rotation shaft of the steering input portion 600 so that a kingpin offset spaced from a central axis of the wheel 900 to the kingpin axis is excessively formed. That is, in FIG. 2, the kingpin axis is formed at a position spaced to an internal side of the wheel 900 in a width direction of the vehicle.

In brief, in various aspects of the present invention, the engagement portion 710 is inclined from the rotation shaft of the steering input portion 600 to allow the kingpin axis to be formed at a position which is substantially the same as the central axis of the wheel 900 so that an inclination of the engagement portion 710 may be determined due to a position at which the kingpin offset is minimized.

Figure 5:
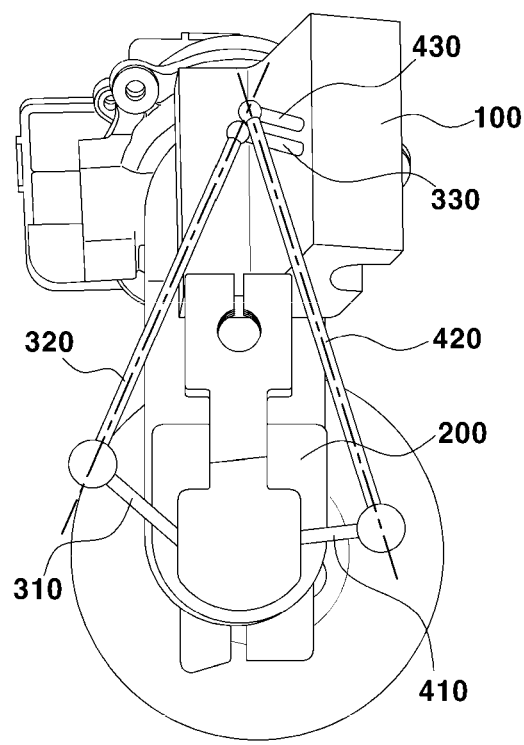
FIG. 5 is a diagram illustrating a change in kingpin axis of the coupling structure of a suspension due to a left-side steering input according to various exemplary embodiments of the present invention.

FIG. 5 illustrates a rear view of a suspension structure when a steering input for performing a left-side turning of the wheel 900 is applied.

As shown in the drawing, owing to the steering input portion 600, the RevoKnuckle 100 is switched to a state of being rotated at about 90 degrees to a left side based on a central axis in a height direction of the vehicle. As the RevoKnuckle 100 is rotated, the first link unit 300 and the second link unit 400 are configured to be moved in a response to movement of the RevoKnuckle 100. The first rotating link 330 of the first link unit 300 is engaged with a lower end portion of one surface of the RevoKnuckle 100 based on one end portion of the first connecting link 320. Furthermore, the second rotating link 430 of the second link unit 400 is engaged at a position adjacent to the first rotating link 330 on the lower end portion of one surface of the RevoKnuckle 100 based on one end portion of the second connecting link 420. Furthermore, when the RevoKnuckle 100 is rotated, the first connecting link 320 and the second connecting link 420 are configured to be moved by as much as a predetermined position while drawing an arc based on the end portions of the first fixing link 310 and the second fixing link 410 in a longitudinal direction of the vehicle. Furthermore, the first rotating link 330 and the second rotating link 430 are configured to be integrally moved with the RevoKnuckle 100 based on the end portions of the first connecting link 320 and the second connecting link 420. When the RevoKnuckle 100 is rotated, one end portion of the first rotating link 330 and one end portion of the second rotating link 430 may be configured to be rotated around between the one end portion of the first rotating link 330 engaged with the first connecting link 320 and the one end portion of the second rotating link 430 engaged with the second connecting link 420.

That is, the RevoKnuckle 100 may be rotated due to the rotating force applied from the steering input portion 600, and in a response to the RevoKnuckle 100 which is rotated, both the end portions of the first connecting link 320 and the second connecting link 420 may be configured as ball joints to allow the position at which the first link unit 300 is engaged with the RevoKnuckle 100 and the position at which the second link unit 400 is engaged with the lower end portion of the RevoKnuckle 100 to be moved.

Figure 6:
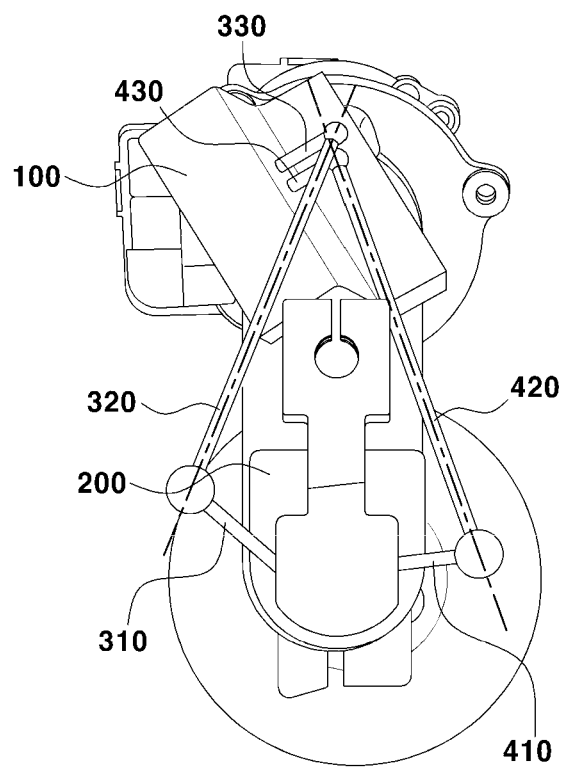
FIG. 6 is a diagram illustrating a change in kingpin axis of the coupling structure of a suspension due to a right-side steering input according to various exemplary embodiments of the present invention.

FIG. 6 illustrates a rear view of a suspension structure in a state in which the RevoKnuckle 100 is rotated at an angle of about 60 degrees to a right side around the height direction of the vehicle due to the steering input portion 600.

In the state in which the RevoKnuckle 100 is rotated at the angle of 60 degrees to the right side, the first link unit 300 and the second link unit 400 are configured to be moved by being interlocked with the RevoKnuckle 100. The first rotating link 330 of the first link unit 300 is configured to be moved to a predetermined position by being interlocked with the RevoKnuckle 100 in the width direction of the vehicle, and the second rotating link 430 of the second link unit 400 is also configured to be interlocked with the RevoKnuckle 100 so that one end portion of the second rotating link 430 adjacent to the first rotating link 330 may be moved.

Furthermore, both the end portions of the first connecting link 320 are configured as the ball joints to allow the first rotating link 330 to be interlocked with the RevoKnuckle 100 to be moved in the width direction of the vehicle. Thus, the first connecting link 320 may be configured to be moved in the longitudinal direction along the rotation direction of the RevoKnuckle 100 based on the first fixing link 310, and the first rotating link 330 may be configured to be further moved in the rotation direction of the RevoKnuckle 100 based on the first connecting link 320.

That is, one end portion of the first connecting link 320 adjacent to the RevoKnuckle 100 and one end portion of the second connecting link 420 adjacent to the RevoKnuckle 100 are configured to be changed in position located in an outermost periphery according to the rotation direction of the RevoKnuckle 100.

Simultaneously, one end portion of the second rotating link 430 engaged with the RevoKnuckle 100 is configured to be integrally moved in the rotation direction of the RevoKnuckle 100 in a state of being adjacent to one end portion of the first rotating link 330. The second connecting link 420 engaged with the second fixing link 410 through a ball joint is configured to be moved to a predetermined position, and the second rotating link 430 engaged with the ball joint at the end portion of the second connecting link 420 is configured to be moved to a position corresponding to the rotation direction of the RevoKnuckle 100.

In brief, the first rotating link 330 and the second rotating link 430 which are engaged with the RevoKnuckle 100 may be configured to be moved to a position corresponding to a rotation amount of the RevoKnuckle 100 by being interlocked therewith. Furthermore, the first connecting link 320 and the second connecting link 420, which are engaged with one end portion of the first fixing link 310 and one end portion of the second fixing link 410 which are fixed to and located in the assist knuckle 200, are configured to be moved to positions corresponding to the rotation direction of the RevoKnuckle 100, and the first rotating link 330 and the second rotating link 430, which are respectively located at the other end portions of the first connecting link 320 and the second connecting link 420, are configured to be integrally moved with the RevoKnuckle 100.

Furthermore, positions of the one end portion of the first rotating link 330 and the one end portion of the second rotating link 430, which are engaged with the RevoKnuckle 100, are determined according to the rotation direction of the RevoKnuckle 100. Thus, the first rotating link 330 or the second rotating link 430, which is located at a position adjacent to the RevoKnuckle 100 being rotated, is moved to be located on an external surface of the vehicle.

Therefore, as shown in FIG. 5, when the RevoKnuckle 100 is rotated to the left side to have a predetermined angle, one end portion of the second rotating link 430 located in the RevoKnuckle 100 on the right side is configured to be moved to one end portion close to the external side of the vehicle. As shown in FIG. 6, when the RevoKnuckle 100 is rotated to the right side to have a predetermined angle, the first rotating link 330 located in the RevoKnuckle 100 is configured to be moved to one end portion close to the external side of the vehicle.

In conclusion, a central rotation axis of the RevoKnuckle 100 is located between one end portion at which the first rotating link 330 and the RevoKnuckle 100 are engaged and one end portion at which the second rotating link 430 is engaged with the RevoKnuckle 100, forming a lower end portion of the kingpin axis.

However, a movement structure of the first link unit 300 and the second link unit 400 according to the left rotation and the right rotation of the RevoKnuckle 100 may be configured in a symmetric form to each other according to the positions of the first link unit 300 and the second link unit 400, and the first link unit 300 and the second link unit 400 may be interpreted as performing behaviors corresponding to each other according to the engagement positions.

As shown in FIG. 5 and FIG. 6, the RevoKnuckle 100 is configured to be rotated due to the rotating force of the steering input portion 600, and the other end portion of the first link unit 300 and the other end portion of the second link unit 400, which are engaged with the lower end portion of the RevoKnuckle 100, are configured to be interlocked with the RevoKnuckle 100 in a response to an amount of rotation thereof.

The present invention can obtain the following effects according to a combination of the above-described embodiments and a configuration, which will be described below, and a use relationship.

In accordance with various aspects of the present invention, there is an effect of reducing a load applied to a steering input portion by providing a universal joint located between a rotation transfer unit and a RevoKnuckle.

Furthermore in accordance, in accordance with various aspects of the present invention, there is an effect of providing a coupling structure of a suspension, which prevents degradation of suspension performance due to an excessive kingpin offset.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A coupling structure of a suspension, the coupling structure comprising:
an assist knuckle in which a strut part is mounted;
a RevoKnuckle rotatably engaged with the assist knuckle, rotated independently from the assist knuckle, and configured to perform steering of a wheel;
a steering input portion engaged to the RevoKnuckle and configured to apply a steering force to the RevoKnuckle during the steering of the wheel;

a rotation transfer unit coupled between the RevoKnuckle and the steering input portion and configured to absorb angular displacement formed between the steering input portion and the RevoKnuckle;

a first link unit having one end portion mounted on a first side surface of the assist knuckle and another end portion mounted at a lower end portion of the RevoKnuckle; and a second link unit having one end portion mounted on a second side surface of the assist knuckle and another end portion mounted adjacent to another end portion of the first link unit at the lower end portion of the RevoKnuckle.

2. The coupling structure of claim 1, wherein the rotation transfer unit is configured so that one end portion of the RevoKnuckle is rotated at a predetermined angle based on a central rotation shaft of the steering input portion.

3. The coupling structure of claim 2, wherein the rotation transfer unit includes:
an engagement portion engaged with the steering input portion; and
a transfer portion engaged with the RevoKnuckle and coupled to the engagement portion to have the predetermined angle based on the engagement portion.

4. The coupling structure of claim 3,
wherein a kingpin axis facing an extension line of the first link unit, an extension line of the second link unit, and an engagement line on which the transfer portion of the steering input portion is engaged with the RevoKnuckle is located adjacent to a tire engaged with the RevoKnuckle.

5. The coupling structure of claim 4,
wherein the kingpin axis is spaced a distance ranging from 0 mm to 30 mm from a center portion of the wheel in a width direction of the vehicle.

6. The coupling structure of claim 1,
wherein a kingpin axis facing an extension line of the first link unit, an extension line of the second link unit, and an engagement line on which the steering input portion is engaged with the RevoKnuckle is located adjacent to a tire engaged with the RevoKnuckle.

7. The coupling structure of claim 6,
wherein the kingpin axis is spaced a distance ranging from 0 mm to 30 mm from a center portion of the wheel in a width direction of the vehicle.

8. The coupling structure of claim 1, wherein the first link unit includes:
a first fixing link engaged with the assist knuckle;
a first rotating link engaged with the RevoKnuckle; and
a first connecting link coupled to the first fixing link and the first rotating link.

9. The coupling structure of claim 8,
wherein one end portion of the first fixing link is fixed to the assist knuckle, and
wherein one end portion of the first rotating link is fixed to the RevoKnuckle.

10. The coupling structure of claim 8, wherein the second link unit includes:
a second fixing link engaged with the assist knuckle;
a second rotating link engaged with the RevoKnuckle; and
a second connecting link coupled to the second fixing link and the second rotating link.

11. The coupling structure of claim 10,
wherein another end portion of the first fixing link engaged with the first rotating link is positioned relatively closer to an external side of a vehicle than an end portion of the second fixing link engaged with the second rotating link.

12. The coupling structure of claim 10,
wherein one end portion of the second fixing link is fixed to the assist knuckle, and
wherein one end portion of the second rotating link is fixed to the RevoKnuckle.

13. The coupling structure of claim 10,
wherein one surface of the RevoKnuckle includes a wheel mount portion in which the wheel is mounted,
wherein an end portion of the first rotating link unit is mounted at the wheel mount, and
wherein an end portion of the second rotating link is mounted at the wheel mount portion of the RevoKnuckle.

14. The coupling structure of claim 9,
wherein distal end portions of the first connecting link include ball joints, and each of the ball joints is engaged with another end portions of the first fixing link and the first rotating link, respectively.

15. The coupling structure of claim 12,
wherein distal end portions of the second connecting link include ball joints, and each of the ball joints is engaged with another end portions of the second fixing link and the second rotating link, respectively.

16. The coupling structure of claim 1, wherein the steering input portion includes a steering motor configured to receive an electronic signal to change a steering angle of the RevoKnuckle.

17. The coupling structure of claim 1,
wherein one surface of the RevoKnuckle includes a wheel mount portion in which the wheel is mounted,
wherein another end portion of the first link unit is mounted at the wheel mount portion of the RevoKnuckle,
wherein another end portion of the second link unit is mounted at the wheel mount portion of the RevoKnuckle.

* * * * *